United States Patent [19]

Yamamura et al.

[11] Patent Number: 5,741,449
[45] Date of Patent: Apr. 21, 1998

[54] CYLINDER TEMPERATURE SETTING METHOD FOR INJECTION MOLDING MACHINE

[75] Inventors: Masato Yamamura, Hachioji; Tokuhisa Miyauchi, Yamanashi; Noriaki Neko, Yamanashi; Osamu Fujioka, Yamanashi, all of Japan

[73] Assignee: Fanuc Ltd, Yamanashi, Japan

[21] Appl. No.: 408,778

[22] Filed: Mar. 23, 1995

[30] Foreign Application Priority Data

Mar. 24, 1994 [JP] Japan .................................. 6-076385

[51] Int. Cl.$^6$ .................................................. B29C 45/74
[52] U.S. Cl. .................... 264/40.6; 264/328.14; 264/328.15; 425/143
[58] Field of Search .................... 264/40.6, 40.1, 264/328.15, 328.14; 425/143

[56] References Cited

U.S. PATENT DOCUMENTS 4,480,981   11/1984   Togawa et al. ........................ 425/143
5,456,870   10/1995   Bulgrin ................................. 264/40.6

FOREIGN PATENT DOCUMENTS

2-31716   2/1990   Japan .
5-12020   3/1993   Japan .

*Primary Examiner*—Lyle A. Alexander
*Attorney, Agent, or Firm*—Staas & Halsey

[57] ABSTRACT

A cylinder temperature setting method in which the cylinder temperature distribution obtained in the condition setting operation is realized with fidelity, even when the molding operation is performed on injection molding machines which are different from the injection molding machine used for condition setting in the number and/or positions of heat sources arranged on the injection cylinder. A waveform representing the cylinder temperature distribution is obtained from the relationship between the temperatures of respective cylinder portions detected by thermocouples and the positions of the respective thermocouples when a conforming product is molded by a reference injection molding machine. The obtained waveform is stored and reserved in a record medium. The target values for temperature control of respective cylinder portions of another injection molding machine are obtained based on the reserved waveform, thereby realizing the cylinder temperature distribution obtained in the condition setting.

12 Claims, 5 Drawing Sheets

| i | NAME | POSITION | TEMPERATURE |
|---|---|---|---|
| 1 | NOZZLE PORTION | h 1' | f (h 1') |
| . | . | . | . |
| . | . | . | . |
| . | . | . | . |
| k | . | h k' | f (h k') |
| k+1 | FRONT PORTION OF CYLINDER | h k+1' | f (h k+1') |
| k+2 | INTERMEDIATE PORTION OF CYLINDER | h k+1' | f (h k+2') |
| . | . | . | . |
| . | . | . | . |
| . | . | . | . |
| k+j | . | h k+j' | f (h k+j') |

FIG. 7

CYLINDER TEMPERATURE SETTING METHOD FOR INJECTION MOLDING MACHINE

BACKGROUND OF THE INVENTION

1. Field of the Invention

This invention relates to a method of setting cylinder temperatures for injection molding machines.

2. Description of the Related Art

In general injection molding machines, a plurality of heat sources such as band heaters are arranged on and along the injection cylinder, and a plurality of temperature sensors for detecting the temperatures of various portions of the cylinder are also arranged in association with the heat sources. In setting the molding conditions for a new mold, the temperatures of various cylinder portions are detected when a conforming product is molded, and then an optimum value of distribution of the cylinder temperatures for the mold is determined. The optimum value of cylinder temperature distribution is determined substantially univocally according to the combination of the mold and the resin used and other molding conditions set at that time. Consequently, when the molding operation is performed again on the same mold using the same resin, it is desirable to realize with fidelity the cylinder temperature distribution obtained in the condition setting.

It is therefore necessary to store the optimum cylinder temperature distribution obtained in the condition setting by some means. For this purpose, it is currently known to record the temperatures of the various cylinder portions, together with other molding conditions, in a molding condition table or to store them in a mold file provided in a controller of the injection molding machine.

In general, the injection molding machine is provided with several band heaters as heat sources. In the conventional molding condition table and mold file, however, the band heaters are roughly classified as "nozzle section", "cylinder front section" and "cylinder rear section" and only set temperatures related to the respective sections are recorded with no data for exact positions of the individual heat sources.

As long as the molding operation is performed on an injection molding machine in which the same number of heat sources are provided at the same positions as in the injection molding machine used for condition setting, no problem arises with respect to the setting of cylinder temperature. However, the molding operation is performed on another injection molding machine with heat sources having different number and/or positions from those of the injection molding machine used for condition setting, the exact cylinder temperature distribution obtained by the condition setting is difficult to realize by setting the cylinder temperature on reference to the molding condition table or the mold file.

SUMMARY OF THE INVENTION

It is therefore an object of the present invention to realize the cylinder temperature contribution obtained by the condition setting with high fidelity even though an injection molding operation is carried out with an injection molding machine in which the heat sources arranged on the cylinder are different in number and/or position from those of the injection molding machine used for condition setting.

A cylinder temperature setting method for injection molding machines of the present invention comprises the steps of: detecting the temperatures of respective portions of the injection cylinder by the temperature detecting means when a conforming product is molded by a first injection molding machine; obtaining a waveform representing a temperature distribution along the axis of the injection cylinder, based on the detected cylinder temperatures; storing and reserving the obtained waveform in storage means; and obtaining target values for temperature control of respective portions of the injection cylinder of a second injection molding machine, which is different from said first injection molding machine in the number and/or positions of the heat sources arranged on the injection cylinder, based on the reserved waveform.

DETAILED DESCRIPTION OF THE PREFERRED EMBODIMENT

Figure 1:
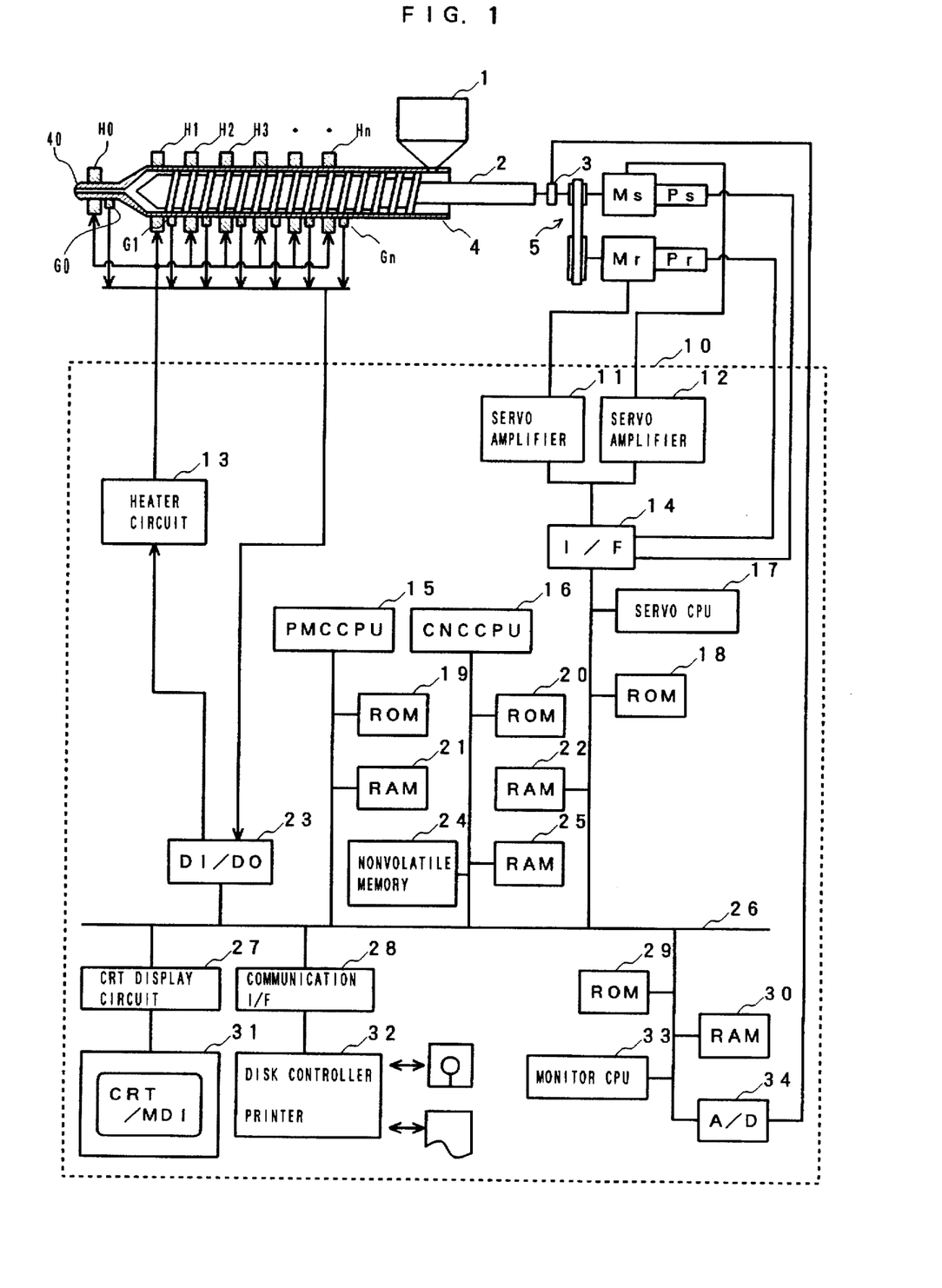
FIG. 1 is a block diagram showing a principle part of an electric injection molding machine for carrying out the method of the present invention.

In FIG. 1, a hopper 1 reserves resin to be supplied to an injection cylinder 4. The injection cylinder 4 has a nozzle portion 40 at a distal end thereof. A screw 2 is moved in an axial direction of the injection cylinder 4 by an injection servo motor Ms and is rotated, for measuring the resin, by a screw-rotation servo motor Mr via a power transmission unit 5 composed of a timing belt and toothed pulleys. At the proximal portion of the screw 2, a pressure detector 3 is provided for detecting a resin reaction acting axially of the screw 2, an injection dwell pressure in the injection dwell operation and a screw back pressure in the measuring and kneading operation are detected. Further, the injection servo motor Ms is provided with a pulse coder Ps for detecting the position and the moving speed of the screw 2, and the screw-rotating servo motor Mr is provided with a pulse coder Pr for detecting the rotational speed of the screw 2.

Figure 7:
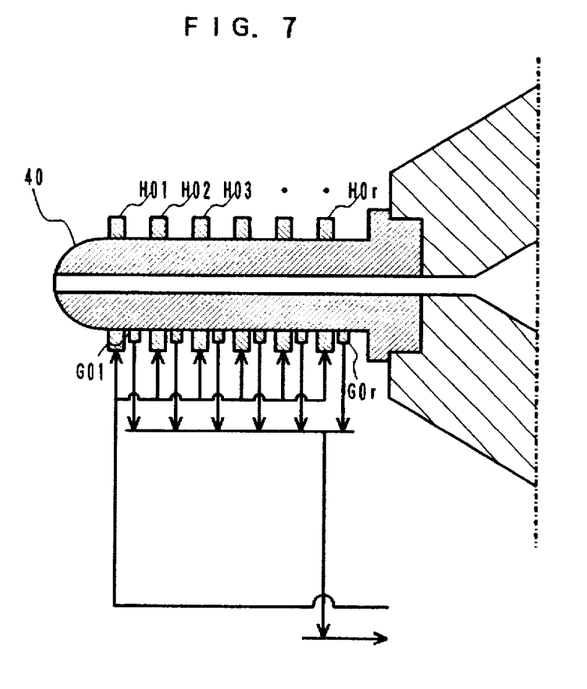
FIG. 7 is a schematic view showing band heaters and the thermocouples arranged on the nozzle portion.

On the cylinder 4 including the nozzle portion 40, there are arranged a plurality of band heaters H0–Hn, each serving as a heat source, and a plurality of thermocouples G0–Gn, each serving as a temperature sensor, for detecting the temperature of the cylinder portion in the vicinity of the respective heat source. Thus, a plurality of pairs of the band heaters and the thermocouples, each associated with the respective heat source, are provided from the nozzle portion 40 to the cylinder base portion. As shown in FIG. 7, a plurality of band heaters H01–H0r and a plurality of thermocouples G01–G0r are arranged at the nozzle portion 40. In FIG. 1, the band heater H0 represents the band heaters H01–H0r and the thermocouple G0 represents the thermocouples G01–G0r for brevity.

A controller 10 of the injection molding machine comprises a CNC CPU 16 as a microprocessor for numerical control, a PMC CPU 15 as a microprocessor for programmable machine control, a servo CPU 17 as a microprocessor for servo control, and a monitor CPU 33 for detecting and sampling the injection dwell pressure and the screw back pressure via an analog-to-digital converter 34. By selecting input/output between the individual microprocessors, information is transmitted between the individual microprocessors via a bus 26.

The PMC CPU 15 is connected with a ROM 19 for storing a sequence program for controlling a sequence operation of the injection molding machine and a RAM 21 to be used for temporary storage of arithmetic data. The CNC CPU 16 is connected with a ROM 20 for storing a program for controlling the individual axes of the injection molding machine and a RAM 25 to be used for temporary storage of arithmetic data. A nonvolatile memory (RAM) 24 connected with the CNC CPU 16 is a molding data reserving memory for storing the molding conditions, various set values, parameters, macro variables etc. for the injection molding operation, and is accessible from the other CPU's.

The servo CPU 17 is connected with a ROM 18 for storing a control program dedicated for servo control and a RAM 22 for temporary storage of data. The monitor CPU 33 is connected with a ROM 29 for storing a control program for the sampling processing to obtain pressure data etc., and a RAM 30 to be used for temporary storage of data. Further, the servo CPU 17 is connected with servo amplifiers 11, 12, and so forth for driving servo motors for various axes based on commands from the CPU 17 via a servo interface 14. The respective outputs from the pulse coders Ps–Pr provided on the servo motors of the individual axes are fed back to the servo CPU 17 via the servo interface 14. The values of the current position, moving speed and rotational speed of the screw 2, which are calculated by the servo CPU 17 based on the feedback pulses from the pulse coders, are stored in a current position storage register and a current speed storage register in the RAM 22. In FIG. 1, only the servo amplifier 11 for the screw-rotating servo motor Mr and the servo amplifier 12 for the injection servo motor Ms are shown and those for other axes are omitted.

The band heaters H1–Hn are switched on and off via an input-output circuit 23 and a heater circuit 13. The temperatures T0–Tn of the heat sources at various portions of the cylinder 4 which are detected by the thermocouples G0–Gn are inputted to the input-output circuit 23, where the temperatures are converted from analog to digital by an analog-to-digital converter (A/D converter) in the input-output circuit 23. The monitor CPU 33 reads the analog-to-digital converted temperatures in every set cycle and then stores the updated values in the RAM 30. The monitor CPU 33 also controls the on/off switching of the band heaters H0 (H01–H0r) to Hn individually so that the temperature of each heat source coincides with a target value stored in the nonvolatile memory 24. Although the number (r+n) of the band heaters is not limited, it is preferable that, in an injection molding machine to be used in condition setting to obtain optimum molding conditions, as many band heaters are employed in order for adjusting the temperature of the individual cylinder portion including the nozzle portion 40 to the finest.

A communication interface 28 is an input-output interface for data transfer to and from an attached equipment 32 such as a disk controller or a printer. A manual data input device 31 with a display is connected to the bus 26 via a CRT display circuit 27 and has numeric keys for numerical data input and various function keys. The operator is allowed to select a monitor display screen and any function from function menu, and also input various kinds of data.

With the foregoing arrangement, the CNC CPU 16 executes pulse distribution to the servomotors for the individual axes based on the control program stored in the ROM 20 and various kinds of set values, and the servo CPU 17 executes a servo control including a position loop control, a speed loop control and a current loop control, as conventional, based on the move commands pulse distributed for respective axes and position feedback and speed feedback signals detected by detectors such as the pulse coders Ps and Pr, thereby performing a so-called digital servo processing.

For a new mold, the condition setting operation for determining molding conditions takes place using an injection molding machine as a reference. The operator calls provisional molding conditions, which are stored in the nonvolatile memory 24, by operating the manual data input device 31 with display, thus modifying the injection condition, the measurement condition, the cylinder temperature condition, etc. The operator carries out a plurality of experimental injection molding operations, if necessary, and then discriminates the conformity of the molded product obtained in each injection molding operation to obtain optimum molding conditions for molding the conforming products stably. At that time, the various cylinder temperatures T0 (T01–T0r) to Tn detected by the thermocouples G0 (G01–G0r) to Gn are read by the monitor CPU 33 via the input-output circuit 23 and are then stored in the RAM 30 as updated data.

Since the injection condition, the measurement condition, the temperature condition etc. are mutually related to give a delicate effect on the quality of a product, such molding condition setting has to be carried out by an experienced operator.

Figure 4:
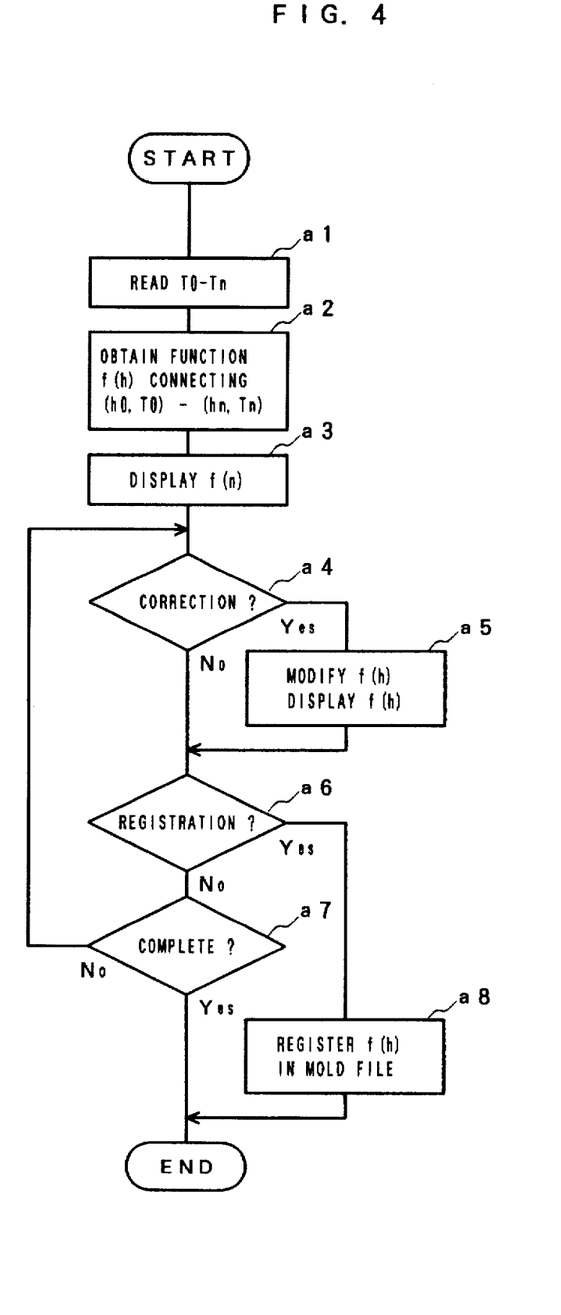
FIG. 4 is a flowchart showing a processing for preparing the temperature distribution data.

A temperature distribution data preparing process for storing the cylinder temperature distribution obtained in the above-mentioned condition setting will now be described with reference to the flowchart of FIG. 4. When the operator selects the menu item "prepare temperature distribution data" and inputs a start command by operating the manual data input device 31 upon completion of the condition setting, the temperature distribution data preparing process is executed by the PMC CPU 15.

Figure 2:
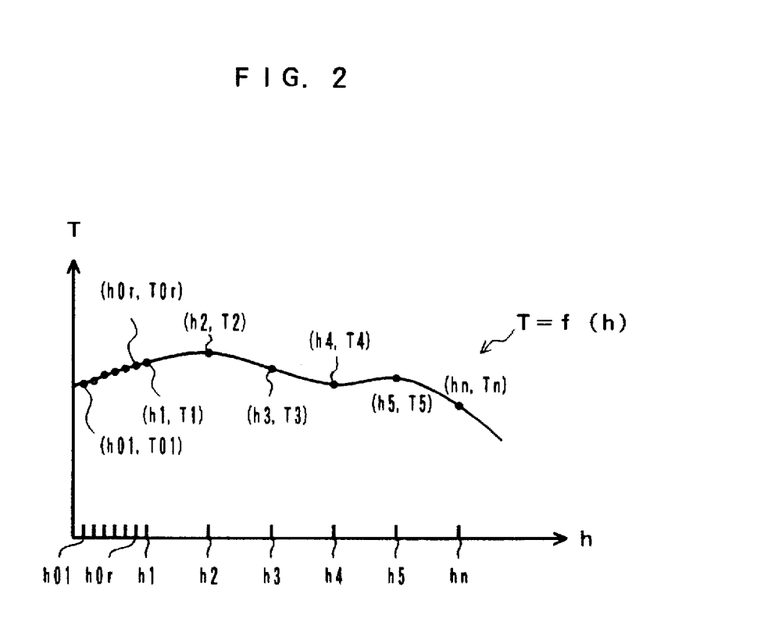
FIG. 2 is a graph showing a spline curve representing a temperature distribution of injection cylinder upon completion of the condition setting.

The PMC CPU 15 reads values of the cylinder temperatures T0 (T01–T0r) to Tn stored in the RAM 30 upon completion of the condition setting and values of the positions h0 (h01–h0r) to hn of the thermocouples G0 (G01–G0r) to Gn, which are previously registered in the nonvolatile memory 24 with the distal end of the cylinder 4 as an original point, to generate arrangement data (h01, T01), (h02, T02), . . . , (h0r, T0r), (h1, T1), (h2, T2), . . . , (hn, Tn) (Step a1). The PMC CPU 15 obtains a function T=f(h) for representing a spline curve connecting the individual arrangement data (Step a2). In a graph of FIG. 2 which shows the axial temperature distribution, h represents a position on the cylinder with the distal end of the cylinder 4 as the original point, and T represents a cylinder temperature. Even for a position devoid of any thermocouple, by substituting for the function T=f(h) the value of a distance h from the distal end of the cylinder 4, it is possible to obtain an approximate value T of the cylinder temperature at the position h.

FIG. 1 shows the thermocouples G0 (G01–G0r) to Gn, each associated with and arranged in the vicinity of each of the band heaters H0 (H01–H0r) to Hn. As mentioned above, although nothing can be better than as many band heaters are arranged in the reference injection molding machine to be used in condition setting, an adequate condition setting may be achieved by cylinder temperature control using only a small number of band heaters if the operator is well experienced. In such an event, since there is a possibility that the function of a spline curve for representing a temperature distribution would be inaccurate when the band heaters are arranged in a one-to-one relation to thermocouples, some thermocouples dedicated for temperature detection, in addition to those for feedback control, have to be arranged at suitable distances on the cylinder 4.

Figure 3:
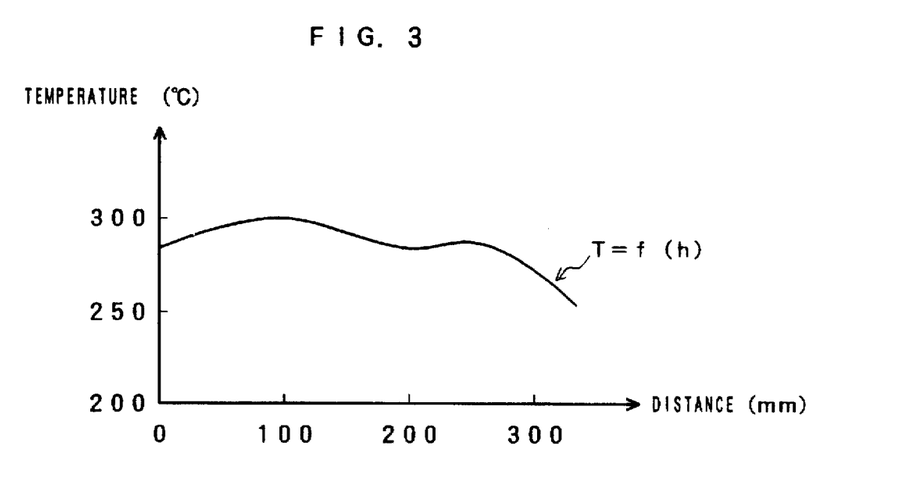
FIG. 3 shows an example of the displayed spline curve representing a temperature distribution of the injection cylinder.

When the function of spline curve for representing temperature distribution is obtained, the PMC CPU 15 displays a graph of the temperature distribution curve based on the function T=f(h) in a coordinate system on the display screen of the manual data input device with X axis standing for distance from the cylinder end and Y axis standing for temperature, as shown in FIG. 3 (Step a3). The PMC CPU 15 then assumes a standby status waiting for operation of any of correction, registration and end keys of the manual data input device 31 (Steps a4, a6, a7).

At that time, if the operator judges that the temperature distribution curve has to be corrected, the operator depresses the correction key of the manual data input device 31 (Step a4) and then performs replacement or addition of the arrangement data by redesignating the curve route with the cursor on reference to the scale of each axis of the coordinates. The operator then causes the PMC CPU 15 to execute the same processings as those of Steps a1–a3 to obtain a new function T=f(h) and to display the updated graph (Step a5). The above operation of correction is effective for the data correction when the shape of the spline curve is inaccurate because of the insufficient data obtained by temperature detection with a small number of thermocouples.

When a satisfactory temperature distribution curve is finally obtained, the operator depresses the registration key (Step a6) to store the function T=f(h) in a mold file corresponding to the mold for which the molding conditions are set, together with the name of resin used and other molding conditions in the nonvolatile memory 24 (Step a8), thus completing the temperature distribution data preparing process.

Further, when the status of distribution of the cylinder temperatures is to be checked in the course of the above-mentioned condition setting, it is possible to display the temperature distribution curve using the primary part of the above-mentioned process. In this case, since it is unnecessary to store the function, the temperature distribution data preparing process is terminated by depressing the end key after checking the displayed temperature distribution curve, without registration (Step a7).

The function of temperature distribution curve and other molding conditions registered in the mold file of the nonvolatile memory 24 can be down-loaded in a storage medium such as a floppy disk via the communication interface 28 and also can be printed by a printer on a record paper as a hard copy, upon selection of the mold file by designating the mold number in the manual data input device 31.

The method of setting the cylinder temperature for another injection mold machine based on the hard copy printed by the printer is particularly effective in a case where there is a difference in construction between the injection molding machines and it is difficult to data transfer via the storage medium such as a floppy disk, for example, when mass-production molding is entrusted to a molding expert in the foreign countries after the manufacturing of the mold and the condition setting take place in the own company. Under these circumstances, it is not assured that the types of injection molding machines are standardized. The operator who operates such injection molding machine for mass production receives a hard copy on which the molding conditions related to the mold to be used and a graph of the temperature distribution curve. The operator sets the injection condition and measurement condition etc. by reference to the data on the hard copy, and sets a target temperature for each band heater (thermocouple) of the mass-production injection molding machine by reference to the hard-copied temperature distribution curve, e.g. the temperature distribution curve of FIG. 3. No matter what kind of mass-production injection molding machine is used, it is possible to actually measure the position of the individual band heater (thermocouple) in the injection cylinder with the distal end of the cylinder as the origin. As the position of the band heater (thermocouple) has been grasped, it is possible to obtain each set temperature for each band heater (thermocouple) on reference to the graph of FIG. 3. When the mass-production injection molding machine is different in number and/or positions of band heaters (thermocouples) from the reference injection molding machine, the same temperature distribution as that of the condition setting is not always realized allover the cylinder, even if the same cylinder temperatures are realized at the specified positions of the cylinder, i.e. the positions of the band heaters (thermocouples) of the mass-production injection molding machine. However, it is possible to achieve the temperature distribution in such a degree as not to hinder the molding.

Figure 5:
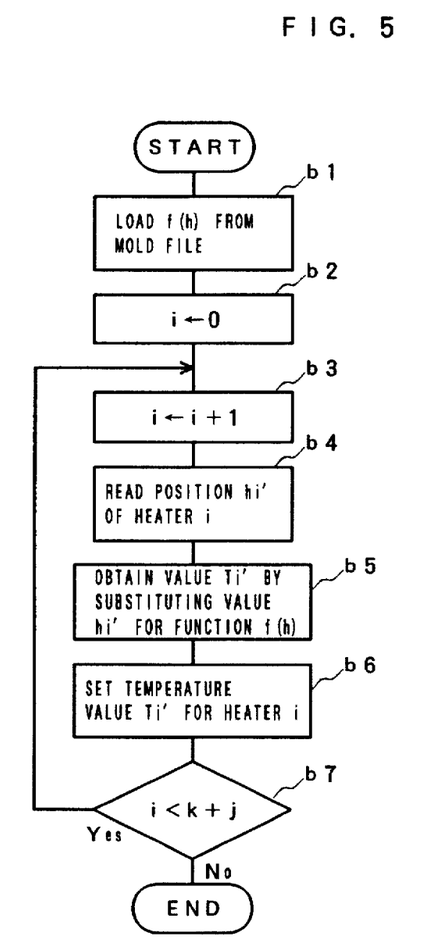
FIG. 5 is a flowchart showing an automatic processing for setting target temperatures of various portions of the injection cylinder.

In a case where the injection molding machine to be used for mass-production is identical in construction and compatible in data transfer via a floppy disk with the injection molding machine used for condition setting, it is possible to automatically perform the whole operation concerning the cylinder temperature setting using a program for automatically setting the cylinder temperature which is previously stored in a controller of the mass-production injection molding machine. FIG. 5 shows one example of the automatic cylinder temperature setting processing. Here it is assumed that at least the control system of the mass-production injection molding machine is identical with that of the injection molding machine used for the condition setting, and therefore the controller 10 of FIG. 1 is employed as the control system of the mass-production injection molding machine. They are different from each other in the number and positions of the band heaters.

The operators who operates the mass-production injection molding machine receives a mold to be used in the molding operation and a floppy disk in which a mold file related to the mold is down-loaded. The operator mounts the mold in the mass-production injection molding machine and sets the floppy disk in a disk drive, and then operates the manual data input device 31 of the mass-production injection molding machine to select the item "automatic setting of cylinder temperature" from the menu.

In response to this, the PMC CPU 15 of the mass-production injection molding machine starts the cylinder temperature automatic setting processing. The PMC CPU 15 firstly reads various molding conditions and the function f(h) of the temperature distribution curve from the mold file in the floppy disk via the communication interface 28 and stores these data in the nonvolatile memory 24 of the mass-production injection molding machine as the molding conditions to be used (Step b1), and initializes the value of a heater index to zero (Step b2).

Figure 6:
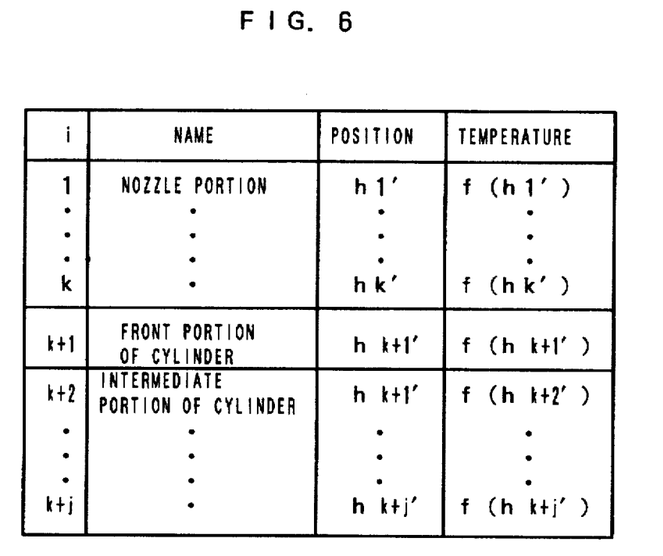
FIG. 6 is a schematic diagram showing a temperature setup file equipped with an injection molding machine for mass-production.

Subsequently, the PMC CPU 15 of the mass-production injection molding machine increases the value of index i by "1" until it reaches the number (k+j) of band heaters of the mass-production injection molding machine (Step b3) and reads the position hi' of each band heater at the respective cylinder portion for every increment of index i (Step b4). The PMC CPU 15 obtains the value Ti' of cylinder temperature corresponding the position hi' by substituting the value hi' for the function f(h) (Step b5) and stores the value Ti' in the temperature setting file of the nonvolatile memory 24 as a target value for each cylinder portion (step b6). FIG. 6 schematically illustrates the temperature setting file in the nonvolatile memory 24 of the mass-production injection molding machine. In the temperature setting file, the number (k+j) of the band heaters of the mass-production injection molding machine and the position hi' of each band heater i=1, 2, ..., (k+j) are previously stored. When the number and/or positions of the heaters are changed, the value of the number (k+j) of the band heaters and/or the position hi' of each heater is updated by the operator's resetting operation on the manual data input device 31. The mass-production injection molding machine is preferably of the easy-to-handle type in which generally the number (k+j) of the heaters is smaller than the number (r+n) of the heaters of the condition-setting injection molding machine.

When it has been checked that the setting of a target temperature value for the individual cylinder position i=1, 2, ..., (k+j) is completed as the value of heater index i reaches the number (k+j) of the heaters (Step b7), the PMC CPU 15 of the mass-production injection molding machine terminates the processing of automatic setting of the cylinder temperature. After the temperatures of the respective cylinder portions reach the target temperatures, the operator starts the automatic molding operation of the injection molding machine according to the molding conditions stored in the nonvolatile memory 24 as the molding conditions to be used, i.e., the molding conditions in the mold file which have been read from the floppy disk for the mold in use.

As mentioned above, if there is a considerable difference in the number of the band heaters and their positions between the condition-setting injection molding machine and the mass-production injection molding machine, there is a possibility that exactly the same temperature distribution as that of the condition setting is not realized allover the cylinder. The automatic molding operation has to be started using the initial set temperatures set by the above-mentioned manual or automatic setting, as long as the error of the temperature distribution does not influence on the conformity of the products. Since the individual factors such as the injection condition, measurement condition and temperature condition are mutually and complicatedly related to influence the quality of products, it is hard for an inexperienced operator to achieve exactly the same temperature distribution as that of condition setting using a mass-production injection molding machine which has a smaller number of band heaters. It needs correction of the injection condition and measurement condition etc. for compensating the error and as a result there would be a possibility that an inappropriate correcting operation might spoil the initial molding conditions.

In the above-described embodiment, the cylinder temperature distribution in the condition setting is approximated by a spline curve. Alternatively, it may be approximated by connecting adjacent arrangement data by a straight line. Further, instead of previously registering the positions hi' (i=1, 2, ..., (k+j)) of the band heaters in the controller of the mass-production injection molding machine, the band heater i to be controlled may be selected and the position hi' of each band heater may be manually inputted to perform the subsequent Steps b5 and b6.

A plurality of heat sources and a plurality of temperature sensors are arranged on the nozzle portion of the cylinder in the embodiment. However, only one pair of a heat source and a temperature sensor may be arranged on the nozzle portion. Further, only the temperature distribution of cylinder body portion excluding the nozzle portion may be obtained as a function without using the detection data of the temperature sensors arranged on the nozzle portion. Furthermore, only the temperature distribution of the nozzle portion may be obtained as a function without using the detection data of the temperature sensors arranged on the cylinder body.

Moreover, the function representing the temperature distribution may be obtained based on the detection of the temperature distribution of stationary and movable molds in addition to the detection of temperatures of various cylinder portions including a nozzle portion.

According to the cylinder temperature setting method of the invention, even if the mass-production injection molding machine is different from the condition-setting injection molding machine in the number and/or positions of heat sources arranged on the cylinder, it is possible to realize with fidelity the cylinder temperature distribution obtained in condition setting.

What is claimed is:

1. A cylinder temperature determination method for injection molding machines, each having an injection cylinder for injecting resin into a mold, a plurality of heat sources arranged axially of the injection cylinder, a plurality of temperature detectors for detecting temperatures of respective portions of the injection cylinder and a temperature controller connected to the heat sources and the temperature detectors, said method comprising the steps of:

(a) detecting the temperatures of the respective portions of the injection cylinder of a first injection molding machine by the temperature detectors when a conforming product is molded by the first injection molding machine;

(b) obtaining a representation of temperature distribution along the axis of the injection cylinder of the first injection molding machine, based on the temperatures detected in step (a);

(c) storing the representation obtained in said step (b); and (d) obtaining target values for temperature control of the respective portions of the injection cylinder of a second injection molding machine based on the representation stored in step (c), where at least one of the heat sources arranged on the injection cylinder of the second injection molding machine does not have a corresponding heat source at an identical position along the axis of the injection cylinder of the first injection molding machine.

2. A cylinder temperature determination method according to claim 1, wherein each of the temperature detectors is associated with one of the heat sources.

3. A cylinder temperature determination method according to claim 1, wherein the injection cylinder has a nozzle at a distal end thereof and at least one of the temperature detectors is arranged on the nozzle.

4. A cylinder temperature determination method according to claim 1, wherein said obtaining in step (b) includes a step of determining a waveform by connecting a plurality of points, representing relationships between each of the temperatures detected in step (a) and respective positions of the temperature detectors, with a spline curve representing the temperature distribution along the axis of the injection cylinder.

5. A cylinder temperature determination method according to claim 1, further comprising the step of printing a waveform corresponding to the representation stored in step (c) on a record paper legible for a human operator.

6. A cylinder temperature determination method according to claim 1, wherein said storing in step (c) includes a step of storing the representation in a storage medium readable by the temperature controller of the second injection molding machine.

7. A cylinder temperature determination method according to claim 6, wherein said obtaining in step (d) includes a step of automatically setting the target values for the temperature control of the respective portions of the injection cylinder.

8. A nozzle temperature determination method for injection molding machines, each having an injection cylinder with a nozzle at a distal end thereof for injecting resin into a mold, a plurality of heat sources arranged axially of the nozzle, a plurality of temperature detectors for detecting temperatures of respective portions of the nozzle and a temperature controller connected to the heat sources and the temperature detectors, said method comprising the steps of:

(a) detecting the temperatures of the respective portions of the nozzle of a first injection molding machine by the temperature detectors when a conforming product is molded by the first injection molding machine;

(b) obtaining a representation of temperature distribution along the axis of the nozzle of the first injection molding machine, based on the temperatures detected in step (a);

(c) storing the representation obtained in said step (b); and (d) obtaining target values for temperature control of the respective portions of the nozzle of a second injection molding machine based on the representation stored in step (c), where at least one of the heat sources arranged on the nozzle of the second injection molding machine does not have a corresponding heat source at an identical position along the axis of the nozzle of the first injection molding machine.

9. A nozzle temperature determination method according to claim 8, wherein said obtaining in step (b) includes a step of determining a waveform by connecting a plurality of points, representing relationships between each of the temperatures detected in step (a) and respective positions of the temperature detectors, with a spline curve representing the temperature distribution along the axis of the nozzle.

10. A nozzle temperature determination method according to claim 8, further comprising the step of printing a waveform corresponding to the representation stored in step (c) on a record paper legible for a human operator.

11. A nozzle temperature determination method according to claim 8, wherein said storing in step (c) includes a step of storing the representation in a storage medium readable by the temperature controller of the second injection molding machine.

12. A nozzle temperature determination method according to claim 11, wherein said obtaining in step (d) includes a step of automatically setting the target values for the temperature control of the respective portions of the nozzle.

* * * * *